United States Patent
Sakai

(10) Patent No.: US 11,302,918 B2
(45) Date of Patent: *Apr. 12, 2022

(54) CATHODE ACTIVE MATERIAL, POSITIVE ELECTRODE FOR LITHIUM ION SECONDARY BATTERY, AND LITHIUM ION SECONDARY BATTERY

(71) Applicant: SUMITOMO CHEMICAL COMPANY, LIMITED, Tokyo (JP)

(72) Inventor: Tomohiro Sakai, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 454 days.

This patent is subject to a terminal disclaimer.

(21) Appl. No.: 16/074,074

(22) PCT Filed: Feb. 3, 2017

(86) PCT No.: PCT/JP2017/004002
§ 371 (c)(1),
(2) Date: Jul. 30, 2018

(87) PCT Pub. No.: WO2017/135416
PCT Pub. Date: Aug. 10, 2017

(65) Prior Publication Data
US 2019/0044136 A1 Feb. 7, 2019

(30) Foreign Application Priority Data

Feb. 3, 2016 (JP) ............... JP2016-019287

(51) Int. Cl.
| | | |
|---|---|---|
| *H01M 4/505* | (2010.01) | |
| *H01M 4/525* | (2010.01) | |
| *C01G 53/00* | (2006.01) | |
| *H01M 10/0525* | (2010.01) | |
| *H01M 4/02* | (2006.01) | |

(52) U.S. Cl.
CPC ............ *H01M 4/505* (2013.01); *C01G 53/00* (2013.01); *C01G 53/44* (2013.01); *C01G 53/50* (2013.01); *H01M 4/525* (2013.01); *H01M 10/0525* (2013.01); *C01P 2002/72* (2013.01); *C01P 2002/76* (2013.01); *C01P 2006/12* (2013.01); *C01P 2006/40* (2013.01); *H01M 2004/028* (2013.01)

(58) Field of Classification Search
CPC ........ C01G 53/00; C01G 53/44; C01G 53/50; C01P 2002/72; C01P 2002/76; C01P 2006/12; C01P 2006/40; H01M 10/0525; H01M 2004/028; H01M 4/505; H01M 4/525

See application file for complete search history.

(56) References Cited

U.S. PATENT DOCUMENTS

| | | | |
|---|---|---|---|
| 2003/0013017 A1* | 1/2003 | Nagayama | ............. C01G 53/42 429/231.3 |
| 2005/0142442 A1 | 6/2005 | Yuasa et al. | |
| 2010/0233542 A1* | 9/2010 | Endo | .................... H01M 4/505 429/223 |
| 2015/0380737 A1 | 12/2015 | Kawasato et al. | |
| 2016/0172673 A1 | 6/2016 | Toya et al. | |
| 2016/0218364 A1 | 7/2016 | Sakai et al. | |
| 2016/0301065 A1 | 10/2016 | Sakai | |

FOREIGN PATENT DOCUMENTS

| | | |
|---|---|---|
| CN | 101878556 A | 11/2010 |
| CN | 105826548 A | 8/2016 |
| JP | 2000-195514 A | 7/2000 |
| JP | 2005-197004 A | 7/2005 |
| JP | 2015-026457 A | 2/2015 |
| JP | 5787079 B2 | 9/2015 |
| JP | 2016-026981 A | 2/2016 |
| JP | 2016-136463 A | 7/2016 |
| JP | 2016-199414 A | 12/2016 |

OTHER PUBLICATIONS

Notification of Transmittal of Translation of the International Preliminary Report on Patentability dated Aug. 16, 2018 in corresponding International Application No. PCT/JP2017/004002 (10 pages).
Search Report issued in corresponding International Patent Application No. PCT/JP2017/004002, dated May 16, 2017.

\* cited by examiner

*Primary Examiner* — Adam A Arciero
(74) *Attorney, Agent, or Firm* — McDermott Will & Emery LLP

(57) ABSTRACT

To provide a cathode active material with which it is possible to obtain a lithium ion secondary battery having a high discharge capacity and being excellent in the cycle characteristic even after 50 cycles; a positive electrode using it; and a lithium ion secondary battery. A cathode active material, which comprises a lithium-containing composite oxide represented by the formula: $aLi(L_{1/3}Mn_{2/3})O_2 \cdot (1-a)LiMO_2$ wherein M is at least one transition metal element selected from Ni, Co and Mn, and $0 < a < 1$; wherein when the lithium-containing composite oxide is electrochemically oxidized to a potential of 4.5 V vs. $Li/Li^+$, in an X-ray diffraction pattern, the integral breadth of a peak of (003) plane assigned to a crystal structure with space group R-3m is at most 0.38 deg, and the integral breadth of a peak of (104) plane assigned to a crystal structure with space group R-3m is at most 0.54 deg.

11 Claims, 4 Drawing Sheets

CATHODE ACTIVE MATERIAL, POSITIVE ELECTRODE FOR LITHIUM ION SECONDARY BATTERY, AND LITHIUM ION SECONDARY BATTERY

CROSS REFERENCE

This application is the U.S. National Phase under 35 U/S.C. § 371 of International Application No. PCT/JP2017/004002, filed on Feb. 3, 2017, which claims the benefit of Japanese Application No. 2016-019287, filed on Feb. 3, 2016, the entire contents of each are hereby incorporated by reference.

TECHNICAL FIELD

The present invention relates to a cathode active material, a positive electrode for a lithium ion secondary battery, and a lithium ion secondary battery.

BACKGROUND ART

As a cathode active material contained in a positive electrode of a lithium ion secondary battery, a lithium-containing composite oxide, particularly $LiCoO_2$, is well known. However, in recent years, for a lithium ion secondary battery for portable electronic instruments or for vehicles, downsizing and weight saving are required, and a further improvement in the discharge capacity of a lithium ion secondary battery per unit mass of the cathode active material (hereinafter sometimes referred to simply as the discharge capacity) is required.

As a cathode active material which may be able to further increase the discharge capacity of a lithium ion secondary battery, a cathode active material having high Li and Mn contents i.e. a so-called lithium rich cathode active material has attracted attention. However, a lithium ion secondary battery using such a lithium rich cathode active material has a problem such that the characteristics to maintain the charge and discharge capacity at the time of repeating a charge and discharge cycle (hereinafter referred to as the cycle characteristics) tend to decrease.

As a lithium rich cathode active material capable of obtaining a lithium secondary battery excellent in the discharge capacity and cycle characteristics, the following (1) has been proposed.

(1) An active material for a non-aqueous electrolyte secondary battery containing a lithium/transition metal composite oxide having a hexagonal structure, wherein the lithium/transition metal composite oxide has a layered rock salt crystal structure or an $\alpha$-$NaFeO_2$ structure and is represented by $Li_aCo_xNi_yMn_zO_2$ wherein a+x+y+z=2, a/(x+y+z) is from 1.25 to 1.60, x/(x+y+z) is from 0.02 to 0.23, z/(x+y+z) is from 0.63 to 0.72, the intensity ratio of a diffraction peak of (003) plane to that of (104) plane by X-ray diffraction, i.e. $I_{(003)}/I_{(104)}$ before charging and discharging is at least 1.58, and when the composite oxide is electrochemically oxidized to a potential of 4.8 V vs. Li/Li$^+$, the composite oxide is observed as a single phase of a hexagonal structure in an X-ray diffraction pattern (Patent Document 1).

PRIOR ART DOCUMENT

Patent Document

Patent Document 1: Japanese Patent No. 5787079

DISCLOSURE OF INVENTION

Technical Problem

However, of a lithium ion secondary battery using the above lithium rich cathode active material (1), if the charge and discharge cycle is conducted more than 50 times, the discharge capacity may suddenly decrease.

It is an object of the present invention to provide a lithium rich cathode active material with which it is possible to obtain a lithium ion secondary battery having a high discharge capacity and being excellent in the cycle characteristics even after 50 cycles; a positive electrode for a lithium ion secondary battery with which it is possible to obtain a lithium ion secondary battery excellent in the discharge capacity and cycle characteristics; and a lithium ion secondary battery excellent in the discharge capacity and cycle characteristics.

Solution to Problem

The present invention provides the following embodiments.

<1> A cathode active material contained in a positive electrode of a lithium ion secondary battery, which comprises a lithium-containing composite oxide represented by the following formula (1):

$$aLi(L_{1/3}Mn_{2/3})O_2 \cdot (1-a)LiMO_2 \qquad \text{formula (1)}$$

wherein M is at least one transition metal element selected from Ni, Co and Mn, and "a" is higher than 0 and less than 1;

wherein when the lithium-containing composite oxide is electrochemically oxidized to a potential of 4.5 V vs. Li/Li$^+$, in an X-ray diffraction pattern, the integral breadth of a peak of (003) plane assigned to a crystal structure with space group R-3m is at most 0.38 deg, and the integral breadth of a peak of (104) plane assigned to a crystal structure with space group R-3m is at most 0.54 deg.

<2> The cathode active material according to <1>, wherein when the lithium-containing composite oxide is electrochemically oxidized to a potential of 4.5 V vs. Li/Li$^+$, in an X-ray diffraction pattern, the ratio ($H_{018}/H_{110}$) of the height ($H_{018}$) of a peak of (018) plane assigned to a crystal structure with space group R-3m to the height ($H_{110}$) of a peak of (110) plane assigned to a crystal structure with space group R-3m is at least 0.27.

<3> The cathode active material according to <1> or <2>, wherein of the lithium-containing composite oxide, in an X-ray diffraction pattern, the ratio ($I_{003}/I_{104}$) of the integrated intensity ($I_{003}$) of a peak of (003) plane assigned to a crystal structure with space group R-3m to the integrated intensity ($I_{104}$) of a peak of (104) plane assigned to a crystal structure with space group R-3m is from 1.015 to 1.5.

<4> The cathode active material according to any one of <1> to <3>, wherein when the lithium-containing composite oxide is electrochemically oxidized to a potential of 4.5 V vs. Li/Li$^+$ in initial charging of the lithium ion secondary battery, in an X-ray diffraction pattern of the lithium-containing composite oxide, the ratio ($H_{020}/H_{003}$) of the height ($H_{020}$) of a peak of (020) plane assigned to a crystal structure with space group C2/m to the height ($H_{003}$) of a peak of (003) plane assigned to a crystal structure with space group R-3m is at least 0.01.

<5> The cathode active material according to any one of <1> to <4>, wherein of the lithium-containing composite oxide, to the total molar amount (X) of Ni, Co and Mn, the ratio (Ni/X) of the molar amount of Ni is from 0.15 to 0.5, the ratio (Co/X) of the molar amount of Co is from 0 to 0.2, and the ratio (Mn/X) of the molar amount of Mn is from 0.45 to 0.8.

<6> The cathode active material according to any one of <1> to <5>, wherein the specific surface area of the cathode active material is from 0.5 to 5 m$^2$/g.

<7> The cathode active material according to any one of <1> to <6>, wherein $D_{50}$ of the cathode active material is from 3 to 15 μm.

<8> The cathode active material according to any one of <1> to <7>, wherein in an X-ray diffraction pattern of the lithium-containing composite oxide, the crystallite size obtained by the Scherrer equation from a peak of (003) plane assigned to a crystal structure with space group R-3m is from 60 to 140 nm.

<9> The cathode active material according to any one of <1> to <8>, wherein in an X-ray diffraction pattern of the lithium-containing composite oxide, the crystallite size obtained by the Scherrer equation from a peak of (110) plane assigned to a crystal structure with space group R-3m is from 30 to 90 nm.

<10> A positive electrode for a lithium ion secondary battery, which comprises a cathode active material layer containing the cathode active material as defined in any one of <1> to <9>, an electrically conductive material and a binder, on a positive electrode current collector.

<11> A lithium ion secondary battery, which comprises the positive electrode for a lithium ion secondary battery as defined in <10>, a negative electrode, a separator and a non-aqueous electrolyte.

Advantageous Effects of Invention

According to the cathode active material of the present invention, it is possible to obtain a lithium ion secondary battery having a high discharge capacity and being excellent in the cycle characteristics even after 50 cycles. According to the positive electrode for a lithium ion secondary battery of the present invention, it is possible to obtain a lithium ion secondary battery having a high discharge capacity and being excellent in the cycle characteristics even after 50 cycles. The lithium ion secondary battery of the present invention has a high discharge capacity and is excellent in the cycle characteristics even after 50 cycles.

DESCRIPTION OF EMBODIMENTS

Figure 1:
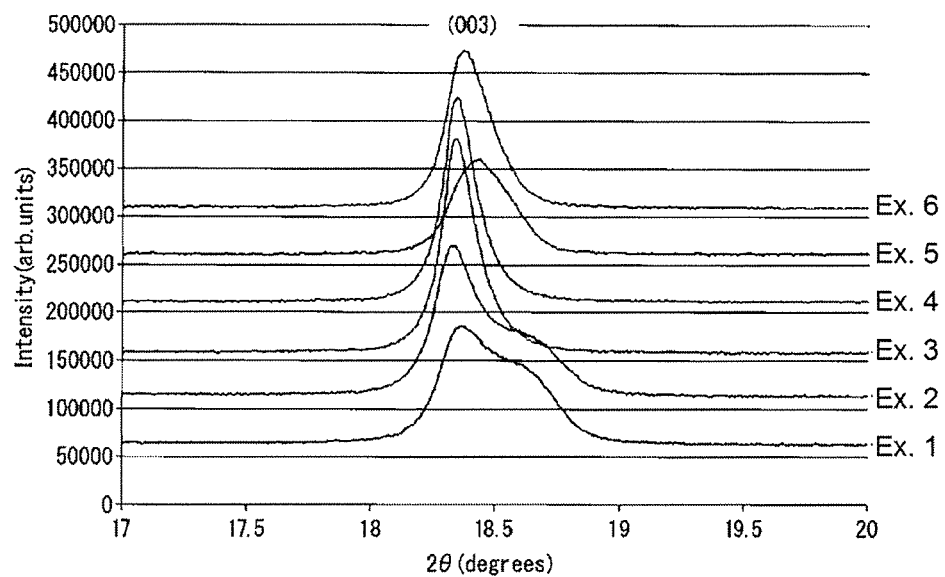
FIG. 1 is a diagram illustrating X-ray diffraction patterns (2θ=17 to 20) of the lithium-containing composite oxides in Ex. 1 to 6.

The following definitions of terms are applied to this specification including Claims.

"Electrochemically oxidized to a potential of 4.5 V vs. Li/Li$^+$" means that when a secondary battery comprising a positive electrode (working electrode) containing a cathode active material, a negative electrode (counter electrode), a reference electrode and a non-aqueous electrolyte is charged, the cathode active material is oxidized up to a potential of the working electrode being 4.5 V to the reference electrode comprising metal lithium. Specific conditions for charging are conditions as disclosed in Examples.

The "activation treatment" means a treatment to withdraw a predetermined amount of $Li_2O$ from the lithium-containing composite oxide contained in the lithium rich cathode active material. This treatment makes the lithium rich cathode active material be capable of being charged and discharged. In this specification, conditions for the activation treatment are not particularly limited. As a specific method of the activation treatment, the method disclosed in Examples may be employed.

The "integral breadth" means the width of a rectangle with the same area and height as a specific peak in an X-ray diffraction pattern.

The "specific surface area" is a specific surface area measured by a BET (Brunauer, Emmet, Teller) method from an adsorption isotherm. In the measurement of the adsorption isotherm, nitrogen gas is used as an adsorption gas. Further, in the measurement of the adsorption isotherm of a hydroxide, a hydroxide dried under conditions as disclosed in Examples is used.

The "$D_{50}$" is a particle size at a point of 50% on an accumulative volume distribution curve which is drawn by obtaining the particle size distribution on the volume basis and taking the whole to be 100%, that is, a volume-based accumulative 50% size.

The "particle size distribution" is obtained from the frequency distribution and accumulative volume distribution curve measured by means of a laser scattering particle size distribution measuring apparatus (for example, a laser diffraction/scattering type particle size distribution measuring apparatus). The measurement is carried out by sufficiently dispersing the powder in an aqueous medium by e.g. ultrasonic treatment.

The "crystallite size" is obtained by the following Scherrer equation from a diffraction angle 2θ (deg) and half-value width B (rad) of a peak of specific plane (abc) in an X-ray diffraction pattern.

$$D_{abc}=(0.9\lambda)/(B\cos\theta)$$

wherein $D_{abc}$ is a crystallite size of (abc) plane, and A is the wavelength of X-rays.

The "theoretical composition ratio" means the ratio (Li/X) of the molar amount of Li to the total molar amount (X) of Ni, Co and Mn in $aLi(L_{1/3}Mn_{2/3})O_2 \cdot (1-a)LiNi_\alpha Co_\beta Mn_\gamma O_2$, when the valence of oxygen (O) is bivalent, Li is monovalent, Mn of Li $(L_{1/3}Mn_{2/3})O_2$ is tetravalent, Ni of $LiNi_\alpha Co_\beta Mn_\gamma O_2$ is bivalent, Co is trivalent, and Mn is tetravalent (in this case, the average valence is trivalent, and $\alpha=\gamma$ in order to satisfy the electrical neutral condition). Specifically, the theoretical composition ratio can be obtained from the theoretical composition ratio Li/X=y+2z, when Ni/X, Co/X and Mn/X in charging at the time of producing a hydroxide are x, y and z (x+y+z=1), respectively. In the calculation, when Li/X is higher than the theoretical composition ratio, "a" becomes large, and $\alpha>\gamma$. Then, the valence of Ni in order to satisfy the valence exceeds 2.

The "hydroxide" includes a hydroxide and an oxyhydroxide in which a hydroxide is partially oxide. That is, a compound represented by $Me(OH)_2$ (wherein Me is a metal element other than Li) includes $Me(OH)_2$, MeOH and a mixture thereof.

The expression "Li" means a Li element, not a Li metal simple substance, unless otherwise specified. The same applies to expressions of other elements such as Ni, Co, Mn, etc.

The composition analysis of a hydroxide and a lithium-containing composite oxide is carried out by inductively-coupled plasma spectrometry (hereinafter referred to as ICP). Further, the ratio of elements in a lithium-containing composite oxide is a value with respect to the lithium-containing composite oxide before the activation treatment.

<Cathode Active Material>

The cathode active material of the present invention (hereinafter referred to as the present cathode active material) is a cathode active material contained in a positive electrode of a lithium ion secondary battery and comprises a specific lithium-containing composite oxide (hereinafter referred to simply as a composite oxide). The present cathode active material preferably comprises secondary particles having primary particles of the composite oxide agglomerated. Further, the present cathode active material may comprise the composite oxide or may be in such a form that the surface of the composite oxide is covered with a covering.

(Lithium-Containing Composite Oxide)

The composite oxide is represented by the following formula (1):

$aLi(Li_{1/3}Mn_{2/3})O_2 \cdot (1-a)LiMO_2$     formula (1)

wherein M is at least one transition metal element selected from Ni, Co and Mn, and "a" is more than 0 and less than 1.

The present cathode active material comprises the composite oxide, whereby the discharge capacity of a lithium ion secondary battery using the present cathode active material is high.

In the formula (1), with a view to further increasing the discharge capacity of the lithium ion secondary battery, M preferably contains Ni and Mn, and more preferably contains Ni, Co and Mn.

In the formula (1), "a" is more than 0 and less than 1. When "a" is more than 0, the discharge capacity of the lithium ion secondary battery having the composite oxide is high. When "a" is less than 1, the discharge voltage of the lithium ion secondary battery having the composite oxide is high. With a view to further increasing the discharge capacity of the lithium ion secondary battery, "a" is preferably at least 0.1, more preferably at least 0.2. Further, with a view to further increasing the discharge voltage of the lithium ion secondary battery, "a" is preferably at most 0.78, more preferably at most 0.75.

The composite oxide represented by the formula (1) is preferably one represented by the following formula (2):

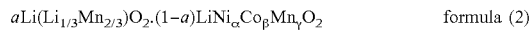

$aLi(Li_{1/3}Mn_{2/3})O_2 \cdot (1-a)LiNi_\alpha Co_\beta Mn_\gamma O_2$     formula (2)

In the formula (2), "a" is the same as "a" in the formula (1).

In the formula (2), $\alpha$ is more than 0 and less than 1. When $\alpha$ is within the above range, the discharge capacity and the discharge voltage of the obtainable lithium ion secondary battery will be higher. $\alpha$ is preferably at least 0.36 and less than 1, more preferably from 0.40 to 0.83.

In the formula (2), $\beta$ is at least 0 and less than 1. When $\beta$ is within the above range, the obtainable lithium ion secondary battery will be excellent in the rate characteristics. $\beta$ is preferably from 0 to 0.33, more preferably from 0 to 0.1.

In the formula (2), $\gamma$ is more than 0 and at most 0.5. When $\gamma$ is within the above range, the discharge voltage and the discharge capacity of the obtainable lithium ion secondary battery will be higher. $\gamma$ is preferably from 0.25 to 0.5, more preferably from 0.3 to 0.5.

In the formula (2), $\alpha$ is preferably larger than $\gamma$. When $\alpha>\gamma$, "a" tends to be large, and the discharge capacity of the obtainable lithium ion secondary battery will be higher. Further, the after-described $W_{003}$, $W_{104}$, $H_{018}/H_{110}$, $I_{003}/I_{104}$, $H_{020}/H_{003}$, $D_{003}$ and $D_{110}$ are likely to be within the after-described ranges.

In the composite oxide, the ratio (Ni/X) of the molar amount of Ni to the total molar amount (X) of Ni, Co and Mn is preferably from 0.15 to 0.5. When Ni/X is within the above range, the discharge capacity and discharge voltage of the lithium ion secondary battery tend to be higher. Further, with a view to further increasing the discharge voltage of the lithium ion secondary battery, Ni/X is more preferably from 0.2 to 0.4, still more preferably from 0.2 to 0.3.

In the composite oxide, the ratio (Co/X) of the molar amount of Co to the total molar amount (X) of Ni, Co and Mn is preferably from 0 to 0.2. When Co/X is within the above range, the rate characteristics of the lithium ion secondary battery tend to be excellent. Further, with a view to achieving more excellent cycle characteristics of the lithium ion secondary battery, Co/X is more preferably from 0 to 0.15, still more preferably from 0 to 0.1.

In the composite oxide, the ratio (Mn/X) of the molar amount of Mn to the total molar amount (X) of Ni, Co and Mn is preferably from 0.45 to 0.8. When Mn/X is within the above range, the discharge voltage and discharge capacity of the lithium ion secondary battery tend to be higher. Further, with a view to further increasing the discharge voltage of the lithium ion secondary battery, the upper limit for Mn/X is more preferably 0.78. With a view to further increasing the discharge capacity of the lithium ion secondary battery, the lower limit for Mn/X is more preferably 0.5, still more preferably 0.6.

In the composite oxide, the ratio (Li/X) of the molar amount of Li to the total molar amount (X) of Ni, Co and Mn is preferably from 1.1 to 1.8. When Li/X is within the above range, the discharge capacity of the lithium ion secondary battery tends to be higher. Li/X is more preferably from 1.1 to 1.7, still more preferably from 1.2 to 1.7.

The composite oxide may contain other element other than Li, Ni, Co and Mn, as the case requires. Such other element may, for example, be P, Mg, Ca, Ba, Sr, Al, Cr, Fe, Ti, Zr, Y, Nb, Mo, Ta, W, Ce, La, etc. With a view to achieving more excellent cycle characteristics of the lithium ion secondary battery, such other element contained in the composite oxide is preferably P. With a view to further increasing the discharge capacity of the lithium ion secondary battery, such other element contained in the composite oxide is preferably at least one member selected from the group consisting of Mg, Al, Cr, Fe, Ti and Zr.

The composite oxide is a solid solution of $Li(Li_{1/3}Mn_{2/3})O_2$ (lithium excess phase) having a layered rock salt crystal structure with space group C2/m and $LiMO_2$ having a layered rock salt crystal structure with space group R-3m. The solid solution type lithium-containing composite oxide having such crystal structures can be confirmed by X-ray diffraction measurement.

The X-ray diffraction measurement is carried out by the method under conditions as disclosed in Examples. The peak of (003) plane assigned to a crystal structure with space group R-3m is a peak which appears at 2θ=18 to 20 deg. The peak of (104) plane assigned to a crystal structure with space group R-3m is a peak which appears at 2θ=43 to 46 deg. The peak of (110) plane assigned to a crystal structure with space group R-3m is a peak which appears at 2θ=64 to 66 deg. The peak of (018) plane assigned to a crystal structure with space group R-3m is a peak which appears at 2θ=63 to 65 deg. The peak of (020) plane assigned to a crystal structure with space group C2/m is a peak which appears at 2θ=20 to 22 deg.

The composite oxide contained in the present cathode active material is such that when the composite oxide is electrochemically oxidized to a potential of 4.5 V vs. $Li/Li^+$ after the lithium ion secondary battery is subjected to activation treatment, in an X-ray diffraction pattern, the integral breadth ($W_{003}$) of a peak of (003) plane assigned to a crystal structure with space group R-3m is at most 0.38 deg, and the integral breadth ($W_{104}$) of a peak of (104) plane assigned to a crystal structure with space group R-3m is at most 0.54 deg. Accordingly, the lithium ion secondary battery is excellent in the cycle characteristics.

The integral breadth $W_{003}$ and the integral breadth $W_{104}$ are preferably values in an X-ray diffraction pattern when the composite oxide is electrochemically oxidized under constant current/constant voltage charging conditions to a potential of 4.5 V vs. $Li/Li^+$ in initial charging after the activation treatment of the lithium ion secondary battery, with a load current of 26 mA per 1 g of the cathode active material for totally 15 hours.

It is considered that when the crystal structure of the composite oxide contained in the cathode active material in the lithium ion secondary battery in a charged (oxidized) state is stable, the crystal structure is stably maintained even after the charge and discharge cycle is repeatedly carried out, and the transition metal element is less likely to be eluted into the non-aqueous electrolyte, whereby the lithium ion secondary battery is excellent in the cycle characteristics.

As an index to the stability of the crystal structure of the composite oxide, a peak of (003) plane assigned to a crystal structure with space group R-3m and a peak of (104) plane assigned to a crystal structure with space group R-3m may be employed. It is considered that these peaks indicate the stability of the crystal structure in the c-axis direction in the crystal structure.

For example, in a case where the crystal structure in the c-axis direction of the composite oxide is disturbed by electrochemical oxidation, that is, when the stability of the crystal structure is low, a peak of (003) plane assigned to a crystal structure with space group R-3m and a peak of (104) plane assigned to a crystal structure with space group R-3m respectively split, and the peak widths apparently broaden.

$W_{003}$ of the composite oxide in the lithium ion secondary battery in a charged state is preferably at most 0.35 deg, more preferably at most 0.32 deg. The lower limit value of $W_{003}$ of the composite oxide is the measurement limit of an X-ray diffraction apparatus and is preferably 0.1 deg.

$W_{104}$ of the composite oxide in the lithium ion secondary battery in a charged state is preferably at most 0.45 deg, more preferably at most 0.38 deg. The lower limit value of $W_{104}$ of the composite oxide is the measurement limit of an X-ray diffraction apparatus and is preferably 0.1 deg.

The composite oxide contained in the present cathode active material is preferably such that when the composite oxide is electrochemically oxidized to a potential of 4.5 V vs. $Li/Li^+$ after the lithium ion secondary battery is subjected to activation treatment, in an X-ray diffraction pattern, the ratio ($H_{018}/H_{110}$) of the height ($H_{018}$) of a peak of (018) plane assigned to a crystal structure with space group R-3m to the height ($H_{110}$) of a peak of (110) plane assigned to a crystal structure with space group R-3m is at least 0.27.

The peak height ($H_{110}$) and the peak height ($H_{018}$) are preferably values in an X-ray diffraction pattern when the composite oxide is electrochemically oxidized under constant current/constant voltage charging conditions to a potential of 4.5 V vs. $Li/Li^+$ in initial charging after the activation treatment of the lithium ion secondary battery, with a load current of 26 mA per 1 g of the cathode active material for totally 15 hours.

In an X-ray diffraction pattern of the composite oxide contained in the lithium ion secondary battery in a charged state, when (018) plane and (110) plane of a layered rock salt crystal structure with space group R-3m are definitely separate, the crystal structure is considered to be in a homogeneous layered structure. Accordingly, when $H_{018}/H_{110}$ of the composite oxide in the lithium ion secondary battery in a charged state is at least 0.27, the layered structure of the composite oxide is favorably maintained, and the discharge capacity of the lithium ion secondary battery can be made higher.

$H_{018}/H_{110}$ of the composite oxide contained in the lithium ion secondary battery in a charged state is preferably at least 0.28, more preferably at least 0.29. $H_{018}/H_{110}$ of the composite oxide contained in the lithium ion secondary battery in a charged state is preferably at most 1.

The composite oxide contained in the present cathode active material is preferably such that in an X-ray diffraction pattern, the ratio ($I_{003}/I_{104}$) of the integrated intensity ($I_{003}$) of a peak of (003) plane assigned to a crystal structure with space group R-3m to the integrated intensity ($I_{104}$) of a peak of (104) plane assigned to a crystal structure with space group R-3m is from 1.015 to 1.5. The ratio ($I_{003}/I_{104}$) is based on values measured with respect to the composite oxide before the lithium ion secondary battery is subjected to activation treatment.

When $I_{003}/I_{104}$ of the composite oxide before the lithium ion secondary battery is subjected to activation treatment is at most 1.5, the crystal structure of C2/m contained in the composite oxide will not too grow. Accordingly, the rate characteristics of the lithium ion secondary battery having a cathode active material containing such a composite oxide can be made higher.

$I_{003}/I_{104}$ of the composite oxide is preferably from 1.015 to 1.3, more preferably from 1.015 to 1.1.

The composite oxide contained in the present cathode active material is preferably such that when the composite oxide is electrochemically oxidized to a potential of 4.5 V vs. Li/Li$^+$ after the lithium ion secondary battery is subjected to activation treatment, in an X-ray diffraction pattern, the ratio ($H_{020}/H_{003}$) of the height ($H_{020}$) of a peak of (020) plane assigned to a crystal structure with space group C2/m to the height ($H_{003}$) of a peak of (003) plane assigned to a crystal structure with space group R-3m is at least 0.01.

Presence of a peak of (020) plane assigned to a crystal structure with space group C2/m in the composite oxide contained in the lithium ion secondary battery after the activation treatment means that a lithium excess phase remains in the composite oxide. Accordingly, when $H_{020}/H_{003}$ is at least 0.01, the discharge capacity of the lithium ion secondary battery can be made higher.

$H_{020}/H_{003}$ of the composite oxide contained in the lithium ion secondary battery in a charged state is preferably at least 0.014, more preferably at least 0.018. $H_{020}/H_{003}$ of the composite oxide in the lithium ion secondary battery in a charged state is preferably at most 0.2, in that the rate characteristics of the lithium ion secondary battery can easily be made favorable.

The peak height ratio ($H_{020}/H_{003}$) is preferably based on values measured in a state where the lithium ion secondary battery is initially charged after activation treatment.

In a crystallite having a layered rock salt crystal structure with space group R-3m, during charging and discharging, each Li diffuses in the a-b axis direction in the same layer, and getting in and out of Li occurs at ends of the crystallite. The c-axis direction of the crystallite is the lamination direction, and in a shape being long in the c-axis direction, the number of ends where Li can get in and out, increases as compared with other crystallites having the same volume. The crystallite size in the a-b axis direction is a crystallite size ($D_{110}$) obtained by the Scherrer equation from a peak of (110) plane assigned to a crystal structure with space group R-3m in an X-ray diffraction pattern of the composite oxide. The crystallite size in the c-axis direction is a crystallite size ($D_{003}$) obtained by the Scherrer equation from a peak of (003) plane assigned to a crystal structure with space group R-3m in an X-ray diffraction pattern of the composite oxide.

In the composite oxide, $D_{003}$ is preferably from 60 to 140 nm, more preferably from 70 to 120 nm, still more preferably from 80 to 115 nm. When $D_{003}$ is at least the above lower limit value, the cycle characteristics of the lithium ion secondary battery having the cathode active material containing the composite oxide can easily be made good. When $D_{003}$ is at most the above upper limit value, the discharge capacity of the lithium ion secondary battery having a cathode active material containing the composite oxide can easily be made high.

In the composite oxide, $D_{110}$ is preferably from 30 to 90 nm, more preferably from 30 to 80 nm, still more preferably from 35 to 75 nm. When Duo is at least the above lower limit value, the stability of the crystal structure will improve. When Duo is at most the above upper limit value, the cycle characteristics of the lithium ion secondary battery having a cathode active material containing the composite oxide can easily be made good.

(Covering)

In the present cathode active material, when the composite oxide has a covering on its surface, the frequency in contact of the composite oxide and the electrolytic solution decreases. As a result, it is possible to reduce elution, into the electrolytic solution, of transition metal elements such as Mn, etc. in the composite oxide during the charge and discharge cycles, whereby the cycle characteristics of the lithium ion secondary battery can be made more excellent.

As the covering, an Al compound (such as $Al_2O_3$, AlOOH or $Al(OH)_3$) is preferred, since it is thereby possible to make the cycle characteristics of the lithium ion secondary battery more excellent without lowering other battery characteristics.

The covering may be present on the surface of the composite oxide, and it may be present over the entire surface of the composite oxide or may be present on a part of the composite oxide. Further, it may be present on the surface of primary particles of the composite oxide or may be present on the surface of secondary particles. The presence of the covering can be confirmed by a contrast of a reflection image of a scanning electron microscope (SEM) or by an electron probe microanalyzer (EPMA).

The amount of the covering is preferably at least 0.01%, more preferably at least 0.05%, particularly preferably at least 0.1% by the ratio of the mass of the covering to the mass of the composite oxide. The mass ratio of the covering is preferably at most 10%, more preferably at most 5%, particularly preferably at most 3% to the mass of the composite oxide. By the presence of the covering on the surface of the composite oxide, an oxidation reaction of the non-aqueous electrolytic solution on the surface of the composite oxide can be suppressed, and the battery life can be improved.

The specific surface area of the present cathode active material is preferably from 0.5 to 5 m$^2$/g, more preferably from 1 to 5 m$^2$/g, still more preferably from 2 to 4 m$^2$/g. When the specific surface area is at least the lower limit value of the above range, the discharge capacity of the lithium ion secondary battery tends to be higher. When the specific surface area is at most the upper limit value of the above range, the cycle characteristics of the lithium ion secondary battery can be made more excellent.

The specific surface area of the present cathode active material is measured by the method disclosed in Examples.

$D_{50}$ of the present cathode active material is preferably from 3 to 15 µm, more preferably from 3 to 12 µm, still more preferably from 4 to 10 µm. When $D_{50}$ is within the above range, the discharge capacity of the lithium ion secondary battery can easily be made high.

(Process for Producing Cathode Active Material)

The present cathode active material may be produced, for example, by a method comprising the following steps (a) to (c).

(a) A step of obtaining a transition metal-containing compound containing at least one transition metal element selected from Ni, Co and Mn.

(b) A step of mixing the transition metal-containing compound and a lithium compound, and firing the obtained mixture to obtain a composite oxide.

(c) As the case requires, a step of forming a covering on the surface of the composite oxide.

Step (a):

The ratio of Ni, Co and Mn contained in the transition metal-containing compound is the same as the ratio of Ni, Co and Mn contained in the composite oxide.

The transition metal-containing compound may, for example, be a hydroxide or a carbonate, and is preferably a hydroxide in that the cycle characteristics of the obtainable lithium ion secondary battery can easily be made favorable.

The transition metal-containing compound is prepared, for example, by coprecipitation method.

The coprecipitation method may, for example, be an alkali coprecipitation method or a carbonate coprecipitation method.

The alkali coprecipitation method is a method wherein an aqueous metal salt solution containing at least one transition metal element selected from Ni, Co and Mn and a pH adjusting liquid containing a strong alkali, are continuously supplied to a reactor and mixed, and while keeping the pH in the mixture constant, a hydroxide containing at least one transition metal element selected from Ni, Co and Mn, is precipitated.

The carbonate coprecipitation method is a method wherein an aqueous metal salt solution containing at least one transition metal element selected from Ni, Co and Mn, and an aqueous carbonate solution containing an alkali metal, are continuously supplied to a reactor and mixed, and in the mixture, a carbonate containing at least one transition metal element selected from Ni, Co and Mn, is precipitated in the mixture.

The coprecipitation method is preferably the alkali coprecipitation method in that the cycle characteristics of the lithium ion secondary battery can thereby easily be made good.

Now, a method for precipitating the hydroxide will be described in detail with reference to the alkali coprecipitation method.

The metal salt may, for example, be a nitrate, an acetate, a chloride or a sulfate of each transition metal element, and a sulfate is preferred, since the material cost is relatively low, and excellent battery characteristics are thereby obtainable. As the metal salt, a sulfate of Ni, a sulfate of Mn and a sulfate of Co are more preferred.

The sulfate of Ni may, for example, be nickel(II) sulfate hexahydrate, nickel(II) sulfate heptahydrate or nickel(II) ammonium sulfate hexahydrate.

The sulfate of Co may, for example, be cobalt(II) sulfate heptahydrate or cobalt(II) ammonium sulfate hexahydrate.

The sulfate of Mn may, for example, be manganese(II) sulfate pentahydrate or manganese(II) ammonium sulfate hexahydrate.

The ratio of Ni, Co and Mn in the aqueous metal salt solution is adjusted to be the same as the ratio of Ni, Co and Mn to be contained in the finally obtainable lithium-containing composite oxide (1).

The total concentration of Ni, Co and Mn in the aqueous metal salt solution is preferably from 0.1 to 3 mol/kg, more preferably from 0.5 to 2.5 mol/kg. When the total concentration of Ni, Co and Mn is at least the above lower limit value, the productivity will be excellent. When the total concentration of Ni, Co and Mn is at most the above upper limit value, the metal salts can be sufficiently dissolved in water.

The aqueous metal salt solution may contain an aqueous medium other than water.

The aqueous medium other than water, may, for example, be methanol, ethanol, 1-propanol, 2-propanol, ethylene glycol, propylene glycol, diethylene glycol, dipropylene glycol, polyethylene glycol, butanediol or glycerin. The proportion of the aqueous medium other than water is preferably from 0 to 20 parts by mass, more preferably from 0 to 10 parts by mass, particularly preferably from 0 to 1 part by mass, per 100 parts by mass of water from the viewpoint of safety, environmental aspect, handling efficiency and costs.

The pH adjusting liquid is preferably an aqueous solution containing a strong alkali.

The strong alkali is preferably at least one member selected from the group consisting of sodium hydroxide, potassium hydroxide and lithium hydroxide.

To the mixed liquid, a complexing agent (aqueous ammonia or an aqueous ammonium sulfate solution) may be added to adjust the solubility of Ni, Co and Mn ions.

The aqueous metal salt solution and the pH adjusting liquid are preferably mixed with stirring in the reactor.

The stirring device may, for example, be a three-one motor, and the stirring blades may, for example, be anchor-type, propeller-type or paddle-type.

The reaction temperature is preferably from 20 to 80° C., more preferably from 25 to 60° C., with a view to accelerating the reaction.

Mixing of the aqueous metal salt solution and the pH adjusting liquid is preferably conducted in a nitrogen atmosphere or in an argon atmosphere, with a view to preventing oxidation of the hydroxide, and it is particularly preferably conducted in a nitrogen atmosphere from the viewpoint of costs.

During the mixing of the aqueous metal salt solution and the pH adjusting liquid, it is preferred to keep the pH in the reactor to be a pH set within a range of from 10 to 12, with a view to letting the coprecipitation reaction proceed properly. When the mixing is conducted at a pH of at least 10, the coprecipitate is deemed to be a hydroxide.

As the method for precipitating a hydroxide, two types may be mentioned, i.e. a method (hereinafter referred to as a concentration method) of carrying out the precipitation reaction while concentrating the hydroxide by withdrawing the mixed liquid in the reactor through a filter (e.g. a filter cloth), and a method (hereinafter referred to as an overflow method) of carrying out the precipitation reaction while maintaining the concentration of the hydroxide to be low by withdrawing the mixed liquid in the reactor, together with the hydroxide, without using a filter. The concentration method is preferred, with a view to making the particle size distribution narrow.

The transition metal-containing compound is preferably washed to remove impurity ions. The washing method may, for example, be a method of repeating pressure filtration and dispersion into distilled water. Such washing, if conducted, is preferably repeated until the electrical conductivity of the filtrate or the supernatant at the time when the transition metal-containing compound is dispersed in distilled water, becomes to be at most 50 mS/m, more preferably at most 20 mS/m.

After the washing, the transition metal-containing compound may be dried as the case requires.

The drying temperature is preferably from 60 to 200° C., more preferably from 80 to 130° C. When the drying temperature is at least the above lower limit value, the drying time can be shortened. When the drying temperature is at most the above upper limit value, it is possible to prevent the progress of oxidation of the transition metal-containing compound.

The drying time may be properly set depending upon the amount of the transition metal-containing compound and is preferably from 1 to 300 hours, more preferably from 5 to 120 hours.

The specific surface area of the transition metal-containing compound is preferably from 3 to 60 $m^2/g$, more preferably from 5 to 40 $m^2/g$. When the specific surface area of the transition metal-containing compound is within the above range, the specific surface area of the present cathode active material can be easily controlled to be within a preferred range. Here, the specific surface area of the transition metal-containing compound is a value measured after the transition metal-containing compound is dried at 120° C. for 15 hours.

$D_{50}$ of the transition metal-containing compound is preferably from 3 to 15.5 µm, more preferably from 3 to 12.5 µm, still more preferably from 4 to 10.5 µm. When $D_{50}$ of the transition metal-containing compound is within the above range, $D_{50}$ of the present cathode active material can be easily controlled to be within a preferred range.

Step (b):

The transition metal-containing compound and a lithium compound are mixed and fired, whereby a composite oxide will be formed.

The lithium compound is preferably one member selected from the group consisting of lithium carbonate, lithium hydroxide and lithium nitrate. Lithium carbonate is more preferred from the viewpoint of handling efficiency in the production process.

The method for mixing the transition metal-containing compound and the lithium compound may, for example, be a method of using a rocking mixer, a Nauta mixer, a spiral mixer, a cutter mill or a V mixer.

The ratio (Li/X) of the molar amount of Li contained in the lithium compound to the total molar amount (X) of Ni, Co and Mn contained in the transition metal-containing compound is preferably from 1.1 to 1.8, more preferably from 1.1 to 1.7, still more preferably from 1.2 to 1.7. When Li/X is within the above range, the Li/X ratio contained in the composite oxide can be made to be within a desired range, and the discharge capacity of the lithium ion secondary battery can be made higher.

The ratio (Li/X) of the molar amount of Li contained in the lithium compound to the total molar amount (X) of Ni, Co and Mn contained in the transition metal-containing compound is preferably higher by from 2 to 16% than the theoretical composition ratio in the lithium-containing composite oxide represented by the formula (2). Li/X is more preferably higher by from 2 to 14% than the theoretical composition ratio, still more preferably higher by from 2 to 12% than the theoretical composition ratio. When Li/X is higher than the theoretical composition ratio, "a" in the formula (2) becomes large, and $\alpha > \gamma$. Thus, it is possible to make the discharge capacity of a lithium iron secondary battery higher. Further, $W_{003}$, $W_{104}$, $H_{018}/H_{110}$, $I_{003}/I_{104}$, $H_{020}/H_{003}$, $D_{003}$ and Duo are likely to be within the above ranges. However, when Li/X is too higher than the theoretical composition ratio, the amount of free alkalis may be large due to excess Li. When a cathode active material containing a large amount of free alkalis is used, the coating property at a time of coating a positive electrode current collector deteriorates, and thereby the productivity deteriorates.

The firing apparatus may, for example, be an electric furnace, a continuous firing furnace or a rotary kiln.

During the firing, the transition metal-containing compound is oxidized, and therefore, the firing is preferably conducted in the atmospheric air, and it is particularly preferably conducted while air is supplied.

The supply rate of air is preferably from 10 to 200 mL/min., more preferably from 40 to 150 mL/min., per 1 L of the inner volume of the furnace.

By supplying air during the firing, the metal element contained in the transition metal-containing compound will be sufficiently oxidized. As a result, it is possible to obtain a composite oxide having high crystallinity and having a crystal structure with space group C2/m and a crystal structure with space group R-3m.

The firing temperature is preferably from 980 to 1,100° C., more preferably from 980 to 1,075° C., still more preferably from 980 to 1,050° C. When the composite oxide is produced under conditions such that Li/X is higher than the theoretical composition ratio and the firing temperature is at least the lower limit value of the above range, $W_{003}$, $W_{104}$, $H_{018}/H_{110}$, $I_{003}/I_{104}$, $H_{020}/H_{003}$, $D_{003}$ and Duo are likely to be within the above ranges. When the firing temperature is at most the upper limit value of the above range, volatilization of Li can be suppressed during the firing, and a composite oxide in accordance with the charge ratio with regard to Li can be obtained. The firing time is preferably from 4 to 40 hours, more preferably from 4 to 20 hours.

The firing may be one-stage firing or two-stage firing i.e. temporary firing followed by main firing. The two-stage firing is preferred since Li thereby tends to be readily uniformly dispersed in the composite oxide. In the case of conducting two-stage firing, main firing is carried out at a temperature within the above firing temperature range. And, the temperature for the temporary firing is preferably from 400 to 700° C., more preferably from 500 to 650° C.

Step (c):

The method for forming the covering may, for example, be a powder mixing method, a gas phase method, a spray coating method or a dipping method. The following description will be made with reference to a case where the covering is an Al compound.

The powder mixing method is a method of mixing the composite oxide and the Al compound, followed by heating. The gas phase method is a method of gasifying an organic compound containing Al, such as aluminum ethoxide, aluminum isopropoxide or aluminum acetylacetonate, and letting the organic compound be in contact with the surface of the composite oxide and reacted. The spray coating method is a method of spraying a solution containing Al to the composite oxide, followed by heating.

Otherwise, a covering containing an Al compound may be formed on the surface of the composite oxide by contacting to the composite oxide, e.g. by a spray coating method, an aqueous solution having dissolved in a solvent, a water-soluble Al compound (such as aluminum acetate, aluminum oxalate, aluminum citrate, aluminum lactate, basic aluminum lactate or aluminum nitrate) to form an Al compound, followed by heating to remove the solvent.

The above-described present cathode active material is a so-called lithium rich cathode active material containing the composite oxide represented by the formula (1), whereby a lithium ion secondary battery having a high discharge capacity can be obtained. Further, in a lithium ion secondary battery in a charged state, $W_{003}$ of the composite oxide contained in the present cathode active material is at most 0.38 deg and $W_{104}$ is at most 0.54 deg, whereby the crystal structure in the c-axis direction of the composite oxide is less likely to be disturbed even in a lithium ion secondary battery in a charged state. Accordingly, the crystal structure of the composite oxide is stably maintained, and the transition metal element is less likely to be eluted into the non-aqueous electrolyte, even when the charge and discharge cycle is repeatedly carried out, and accordingly a lithium ion secondary battery excellent in the cycle characteristics even after 50 cycles can be obtained.

<Positive Electrode for Lithium Ion Secondary Battery>

The positive electrode for a lithium ion secondary battery of the present invention (hereinafter referred to as the present positive electrode) contains the present cathode active material. Specifically, the positive electrode comprises a cathode active material layer containing the present cathode active material, an electrically conductive material and a binder, on a positive electrode current collector.

As the electrically conductive material, carbon black (such as acetylene black or Ketjen black), graphite, vapor-grown carbon fibers or carbon nanotubes may, for example, be mentioned.

As the binder, a fluorinated resin (such as polyvinylidene fluoride or polytetrafluoroethylene), a polyolefin (such as polyethylene or polypropylene), a polymer or copolymer having unsaturated bonds (such as a styrene/butadiene rubber, an isoprene rubber or a butadiene rubber) or an acrylic polymer or copolymer (such as an acrylic copolymer or a methacrylic copolymer) may, for example, be mentioned.

As the positive electrode current collector, an aluminum foil or a stainless steel foil may, for example, be mentioned.

The present positive electrode may be produced, for example, by the following method.

The present cathode active material, the electrically conductive material and the binder are dissolved or dispersed in a medium to obtain a slurry. The obtained slurry is applied to the positive electrode current collector, and the medium is removed e.g. by drying to form a cathode active material layer. As the case requires, the cathode active material layer may be pressed e.g. by roll pressing. The present positive electrode is obtained in such a manner.

Otherwise, the present cathode active material, the electrically conductive material and the binder are kneaded with a medium to obtain a kneaded product. The obtained kneaded product is pressed on the positive electrode current collector to obtain the present positive electrode.

The above-described present positive electrode contains the present cathode active material, whereby it is possible to obtain a lithium ion secondary battery having a high discharge capacity and being excellent in the cycle characteristics even after 50 cycles.

<Lithium Ion Secondary Battery>

The lithium ion secondary battery of the present invention (hereinafter referred to as the present battery) has the present positive electrode. Specifically, it comprises the present positive electrode, a negative electrode, a separator and a non-aqueous electrolyte.

(Negative Electrode)

The negative electrode contains an anode active material. Specifically, it has an anode active material layer containing an anode active material and as the case requires an electrically conductive material and a binder, formed on a negative electrode current collector.

The anode active material may be any material so long as it is capable of absorbing and desorbing lithium ions at a relatively low potential. The anode active material may, for example, be a lithium metal, a lithium alloy, a lithium compound, a carbon material, an oxide composed mainly of a metal in Group 14 of the periodic table, an oxide composed mainly of a metal in Group 15 of the periodic table, a carbon compound, a silicon carbide compound, a silicon oxide compound, titanium sulfide or a boron carbide compound.

The carbon material as the anode active material may, for example, be non-graphitized carbon, artificial graphite, natural graphite, thermally decomposed carbon, cokes (such as pitch coke, needle coke or petroleum coke), graphites, glassy carbons, an organic polymer compound fired product (product obtained by firing and carbonizing a phenol resin, a furan resin or the like at an appropriate temperature), carbon fibers, activated carbon or carbon blacks.

The metal in Group 14 of the periodic table to be used as the anode active material may be Si or Sn, and is preferably Si.

As another anode active material, an oxide such as iron oxide, ruthenium oxide, molybdenum oxide, tungsten oxide, titanium oxide or tin oxide, or a nitride may, for example, be mentioned.

As the electrically conductive material and the binder for the negative electrode, the same ones as for the positive electrode may be used.

As the negative electrode current collector, a metal foil such as a nickel foil or a copper foil may be mentioned.

The negative electrode may be produced, for example, by the following method.

The anode active material, the electrically conductive material and the binder are dissolved or dispersed in a medium to obtain a slurry. The obtained slurry is applied to the negative electrode current collector, and the medium is removed e.g. by drying, followed by pressing to obtain the negative electrode.

(Non-Aqueous Electrolyte)

The non-aqueous electrolyte may, for example, be a non-aqueous electrolytic solution having an electrolyte salt dissolved in an organic solvent; an inorganic solid electrolyte; or a solid or gelled polymer electrolyte in which an electrolyte salt is mixed or dissolved.

The organic solvent may be an organic solvent known for a non-aqueous electrolytic solution. Specifically, it may, for example, be propylene carbonate, ethylene carbonate, diethyl carbonate, dimethyl carbonate, 1,2-dimethoxyethane, 1,2-diethoxyethane, γ-butyrolactone, diethyl ether, sulfolane, methyl sulfolane, acetonitrile, an acetic acid ester, a butyric acid ester or a propionic acid ester. In view of the voltage stability, preferred is a cyclic carbonate (such as propylene carbonate) or a chain-structured carbonate (such as dimethyl carbonate or diethyl carbonate). As the organic solvent, one type may be used alone, or two or more types may be used in combination.

As the inorganic solid electrolyte, a material having lithium ion conductivity may be used. The inorganic solid electrolyte may, for example, be lithium nitride or lithium iodide.

As the polymer to be used for the solid polymer electrolyte, an ether polymer compound (such as polyethylene oxide or its crosslinked product), a polymethacrylate ester polymer compound or an acrylate polymer compound may, for example, be mentioned. As the polymer compound, one type may be used alone, or two or more types may be used in combination.

As the polymer to be used for the gelled polymer electrolyte, a fluorinated polymer compound (such as polyvinylidene fluoride or a vinylidene fluoride/hexafluoropropylene copolymer), polyacrylonitrile, an acrylonitrile copolymer or an ether polymer compound (such as polyethylene oxide or its crosslinked product) may, for example, be mentioned. As a monomer to be copolymerized to obtain the copolymer, polypropylene oxide, methyl methacrylate, butyl methacrylate, methyl acrylate or butyl acrylate may, for example, be mentioned.

The polymer compound is preferably a fluorinated polymer compound in view of the stability against the redox reaction.

As the electrolyte salt, any one of those commonly used for a lithium ion secondary battery may be used. The electrolyte salt may, for example, be $LiClO_4$, $LiPF_6$, $LiBF_4$ or $CH_3SO_3Li$.

Between the positive electrode and the negative electrode, a separator may be interposed so as to prevent short-circuiting. As the separator, a porous film may be mentioned. The porous film is used as impregnated with the non-aqueous electrolytic solution. Further, the porous film impregnated with the non-aqueous electrolytic solution, followed by gelation, may be used as a gelled electrolyte.

As a material of a battery exterior package, nickel-plated iron, stainless steel, aluminum or its alloy, nickel, titanium, a resin material or a film material may, for example, be mentioned.

The shape of the lithium ion secondary battery may, for example, be a coin-shape, a sheet-form (film-form), a folded shape, a wound cylinder with bottom, or a button shape, and is suitably selected depending upon the intended use.

The above-described present battery, which comprises the present positive electrode, has a high discharge capacity and is excellent in cycle characteristics even after 50 cycles.

EXAMPLES

Now, the present invention will be described in detail with reference to Examples, but it should be understood that the present invention is by no means thereby restricted. Ex. 3 to 6 are Examples of the present invention, and Ex. 1 and 2 are Comparative Examples.

($D_{50}$)

The hydroxide or the cathode active material was sufficiently dispersed in water by ultrasonic treatment, and the measurement was conducted by a laser diffraction/scattering type particle size distribution measuring apparatus (MT-3300EX manufactured by NIKKISO CO., LTD.), to obtain the frequency distribution and cumulative volume distribution curve, whereby the volume-based particle size distribution was obtained. From the obtained cumulative volume distribution curve, $D_{50}$ was obtained.

(Specific Surface Area)

The specific surface area of the hydroxide or the cathode active material was calculated by a nitrogen adsorption BET method using a specific surface area measuring apparatus (HM model-1208, manufactured by Mountech Co., Ltd.). Degassing was carried out at 200° C. for 20 minutes.

(Composition Analysis)

Composition analysis of the hydroxide and the lithium-containing composite oxide was carried out by a plasma emission spectroscope (SPS3100H manufactured by SII NanoTechnology Inc.). From the ratio of the molar amounts of Li, Ni, Co and Mn obtained from the composition analysis, "a", α, β and γ in the formula: $aLi(Li_{1/3}Mn_{2/3})O_2 \cdot (1-a)LiNi_\alpha Co_\beta Mn_\gamma O_2$ were calculated.

(X-Ray Diffraction)

The X-ray diffraction of the lithium-containing composite oxide before activation treatment and that after initial charging were measured by means of an X-ray diffraction apparatus (manufactured by Rigaku Corporation, apparatus name: SmartLab). The measurement conditions are shown in Table 1. The measurement was carried out at 25° C. With respect to measurement before the activation treatment, 1 g of the lithium-containing composite oxide and 30 mg of standard sample 640e for X-ray diffraction were mixed in an agate mortar, and this mixture was used as the sample for the measurement.

With respect to the X-ray diffraction pattern obtained, peak search was carried out by using integrated X-ray powder diffraction software PDXL2 manufactured by Rigaku Corporation. From the respective peaks, $W_{003}$, $W_{104}$, $H_{018}/H_{110}$, $I_{003}/I_{104}$, $H_{020}/H_{003}$, $D_{003}$ and Duo were obtained.

TABLE 1

| | | |
|---|---|---|
| Apparatus condition | Measurement apparatus | SmartLab manufactured by Rigaku Corporation |
| | Target | Cu |
| | Detector | D/teX Ultra HE manufactured by Rigaku Corporation |
| | Detector baseline | 44 div |
| | Detector window | 8 div |
| | Gonio length | 300 mm |
| | Soller/PSC | 5.0 (deg.) |
| | IS long dimension | 10 (mm) |
| | PSA | Open |
| | Soller | 5.0 (deg.) |
| | Monochromatization method | Kβ filter method |
| Sample condition | Sample holder | Diameter: 24 mm, depth: 0.5 mm |
| | Rotation of sample during measurement | Rotated (30 rpm) |
| Measurement condition | Measurement method | General purpose measurement (focal method) |
| | Scanning axis | 2θ/θ |
| | Mode | Continuous |
| | Range specification | Absolute |
| | Initiation (deg.) | 15 (deg.) |
| | Termination (deg.) | 70 (deg.) |
| | Step (deg.) | 0.0052 (deg.) |
| | Speed measurement time | 1 (deg./min.) |
| | IS (deg.) | ⅓ (deg.) |
| | RS1 (mm) | 8 (mm) |
| | RS2 (mm) | 13 (mm) |
| | Attenuator | Open |
| | Tube voltage (kV) | 45 (kV) |
| | Tube current (mA) | 200 (mA) |
| Data condition processing | Analysis software | PDXL2 manufactured by Rigaku Corporation |
| | Smoothing | Smoothing by B-Spline, χ threshold: 1.50 |
| | Background removal | Fitting |
| | Kα2 removal | Intensity ratio: 0.4970 |
| | Peak search | Secondary differentiation, σ cut: 3.00 |
| | Profile fitting | Fitting of measurement data |
| | Peak shape | Variance pseudo-voigt function |

(Production of Positive Electrode Sheet)

The cathode active material obtained in each Ex., electrically conductive carbon black as an electrically conductive material, and polyvinylidene fluoride as a binder were weighed in a mass ratio of 88:6:6, and they were added to N-methylpyrrolidone to prepare a slurry.

The slurry was applied on one side of an aluminum foil as a positive electrode current collector having a thickness of 20 μm by means of a doctor blade. The gap of the doctor blade was adjusted so that the thickness of the sheet after roll pressing would be 20 μm. After drying at 120° C., roll pressing was carried out twice to prepare a positive electrode sheet.

(Production of Lithium Ion Secondary Battery)

The positive electrode sheet was punched out into a rectangle of 24 mm×40 mm, which was used as a positive electrode.

Artificial graphite was used as a negative electrode material, and an artificial graphite sheet was punched out into a rectangle of 44 mm×28 mm, which was used as a negative electrode.

As a separator, a porous polypropylene having a thickness of 25 μm was used.

As an electrolytic solution, a liquid having LiPFe dissolved at a concentration of 1 mol/dm³ in a solvent mixture of ethylene carbonate and diethyl carbonate in a volume ratio of 3:7, was used.

Using the positive electrode, the negative electrode, the separator and the electrolytic solution, a laminate type lithium ion secondary battery was assembled in a globe box in a dry atmosphere.

(Activation Treatment)

With respect to each lithium ion secondary battery using the cathode active material in each Ex., constant current charging to 4.75 V with a load current of 26 mA per 1 g of the cathode active material, was carried out.

After the constant current charging, constant current discharging to 2 V with a load current of 26 mA per 1 g of the cathode active material was carried out as an activation treatment. The discharge capacity on that occasion was taken as the initial discharge capacity.

(Cycle Test)

With respect to the lithium ion secondary battery subjected to the activation treatment, constant current and constant voltage charging was carried out for 90 minutes to 4.45 V with a load current of 200 mA per 1 g of the cathode active material, followed by constant current discharging to 2 V with a load current of 200 mA per 1 g of the cathode active material. The discharge capacity in the first cycle of the cycle test was taken as the initial discharge capacity. This charge and discharge cycle was repeated 100 times in total. The 50c/2c cycle capacity retention (%) was obtained in accordance with the following formula from the discharge capacity in the second cycle and the discharge capacity in the 50th cycle. The 100c/2c cycle capacity retention (%) was obtained in accordance with the following formula from the discharge capacity in the second cycle and the discharge capacity in the 100th cycle.

50$c$/2$c$ cycle capacity retention (%)=discharge capacity in the 50th cycle/discharge capacity in the 2nd cycle×100

100$c$/2$c$ cycle capacity retention (%)=discharge capacity in the 100th cycle/discharge capacity in the 2nd cycle×100

(Preparation of Lithium Secondary Battery in Charged State)

The positive electrode sheet was punched out into a circle having a diameter of 18 mm, which was used as a positive electrode.

A lithium foil was used as a negative electrode material, and the lithium foil punched out into a circle having a diameter of 19 mm, which was used as a negative electrode.

As a separator, a porous polypropylene having a thickness of 25 μm was used.

As an electrolytic solution, a liquid having LiPF$_6$ dissolved at a concentration of 1 mol/dm$^3$ in a solvent mixture of ethylene carbonate and diethyl carbonate in a volume ratio of 3:7, was used.

Using the positive electrode, the negative electrode, the separator and the electrolytic solution, a flange type lithium ion secondary battery was assembled in a glove box in an argon atmosphere.

With respect to the lithium ion secondary battery using the cathode active material in each Ex., constant current charging to 4.8 V vs. Li/Li$^+$ with a load current of 26 mA per 1 g of the cathode active material was carried out.

After the constant current charging, constant current discharging to 2 V vs. Li/Li$^+$ with a load current of 26 mA per 1 g of the cathode active material was carried out, as an activation treatment.

With respect to the lithium secondary battery subjected to the activation treatment, constant current/constant voltage charging was carried out for 15 hours to 4.5 V vs. Li/Li$^+$ with a load current of 26 mA per 1 g of the cathode active material to electrochemically oxidize the cathode active material.

(X-Ray Diffraction after Initial Charging)

After charging of the lithium secondary battery, the flange cell was disassembled in an argon glove box, and the positive electrode sheet was taken out.

The positive electrode sheet was washed in diethyl carbonate for one minute and dried in an argon glove box at room temperature.

The washed positive electrode sheet was bonded to a Si non-reflection holder with a double-sided adhesive tape so that the positive electrode material side faced downward, and the aluminum foil was removed by tweezers. Using the cathode active material remaining on the holder, an X-ray diffraction pattern of the lithium composite oxide contained in the lithium secondary battery in a charged state was obtained.

Ex. 1

Nickel(II) sulfate hexahydrate and manganese(II) sulfate pentahydrate were dissolved in distilled water so that the ratio of molar amounts of Ni and Mn would be as shown in Table 2 and the total amount of the sulfates would be 1.5 mol/kg to obtain an aqueous sulfate solution.

As a pH adjusting liquid, sodium hydroxide was dissolved in distilled water so that the concentration would be 1.5 mol/kg to obtain an aqueous sodium hydroxide solution.

As a complexing agent, ammonium sulfate was dissolved in distilled water so that the concentration would be 1.5 mol/kg to obtain an aqueous ammonium sulfate solution.

Into a 2 L baffle-equipped glass reactor, distilled water was put and heated to 50° C. by a mantle heater. While stirring the liquid in the reactor by a paddle type stirring blade, the aqueous sulfate solution was added at a rate of 5.0 g/min and the aqueous ammonium sulfate solution was added at a rate of 0.5 g/min, for 12 hours, and the pH adjusting liquid was added to keep the pH of the mixed liquid to be 10.5, to precipitate a hydroxide containing Ni and Mn. During the addition of the raw material solutions, nitrogen gas was made to flow at a rate of 1.0 L/min in the reactor. Further, a liquid containing no hydroxide was continuously withdrawn using filter cloth, so that the liquid amount in the reactor would not exceed 2 L. In order to remove impurity ions from the obtained hydroxide, pressure filtration and dispersion in distilled water were repeated for washing. Washing was completed at a point where the electrical conductivity of the filtrate became 20 mS/m, and the hydroxide was dried at 120° C. for 15 hours.

The hydroxide and lithium carbonate were mixed so that the ratio of the molar amount of Li to the total molar amount of Ni, Co and Mn (Li/X) would be as identified in Table 3, to obtain a mixture.

In an electric furnace, while supplying air, the mixture was subjected to temporary firing at 600° C. in air over a period of 3 hours to obtain a temporarily fired product.

Figure 2:
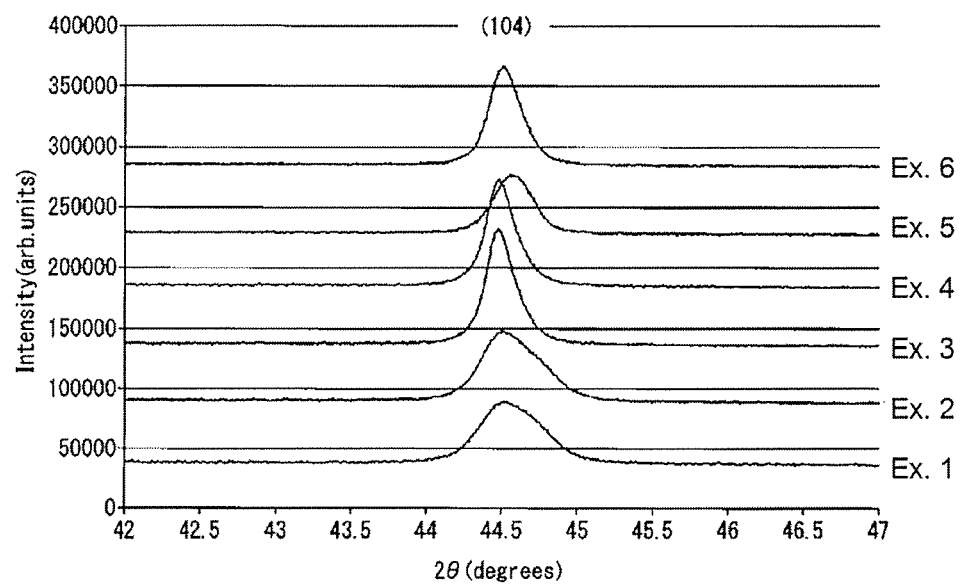
FIG. 2 is a diagram illustrating X-ray diffraction patterns (2θ=42 to 47) of the lithium-containing composite oxides in Ex. 1 to 6.
Figure 3:
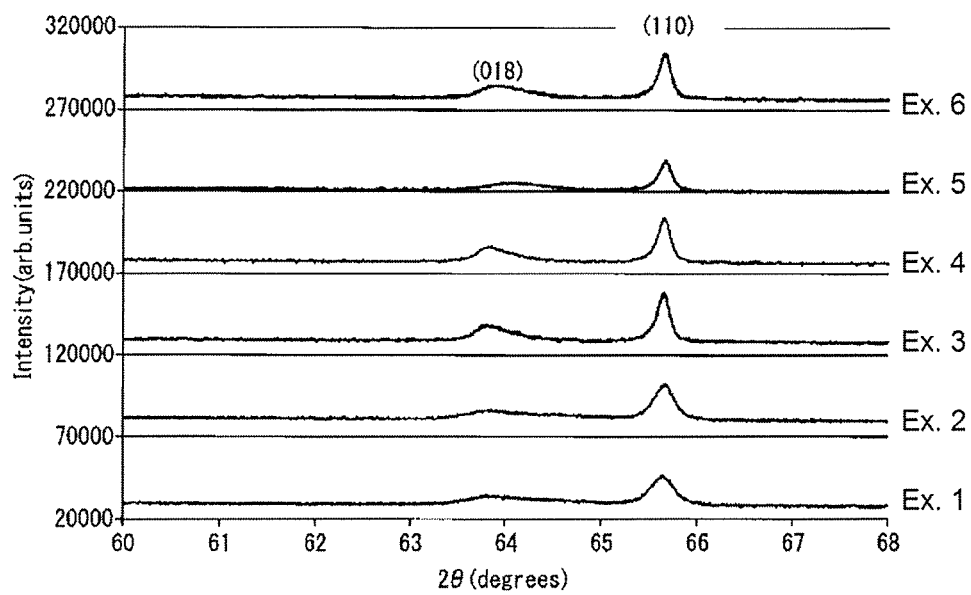
FIG. 3 is a diagram illustrating X-ray diffraction patterns (2θ=60 to 68) of the lithium-containing composite oxides in Ex. 1 to 6.
Figure 4:
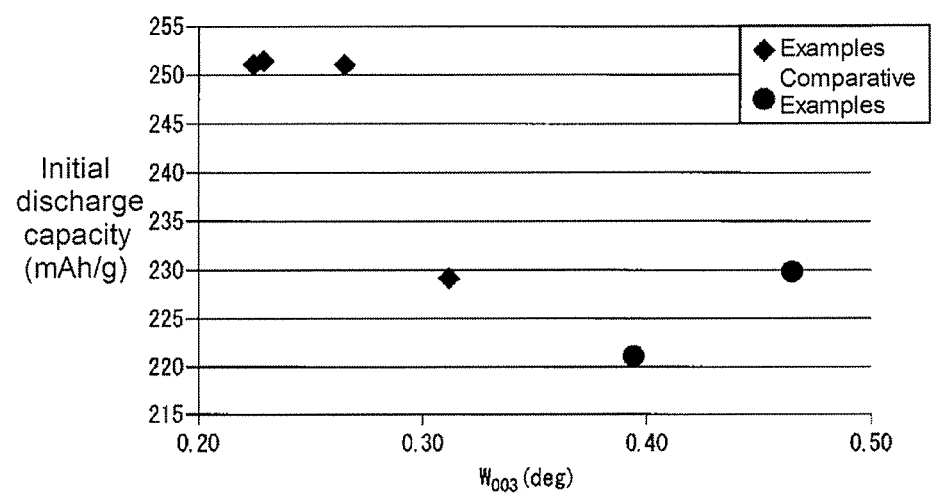
FIG. 4 is a graph illustrating the relation between the integral breadth ($W_{003}$) of a peak of (003) plane assigned to a crystal structure with space group R-3m and the initial discharge capacity.
Figure 5:
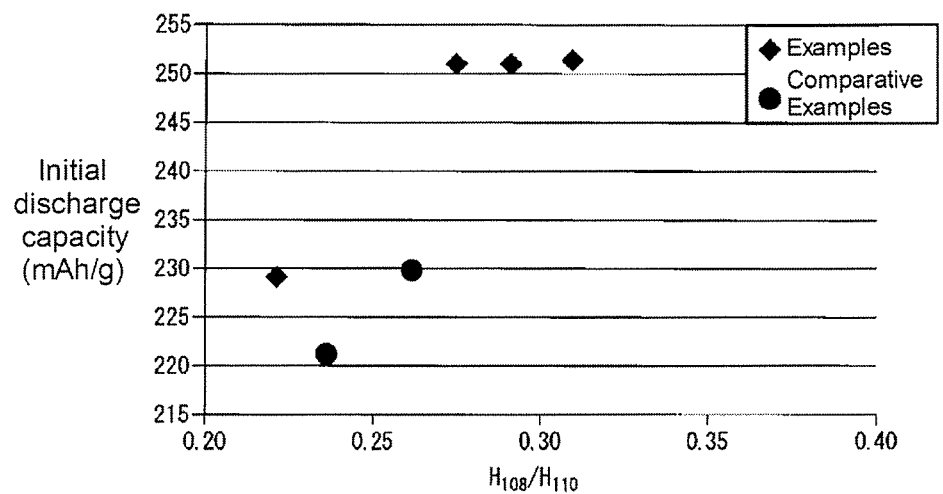
FIG. 5 is a graph illustrating the relation between the ratio ($H_{108}/H_{110}$) of the height ($H_{018}$) of a peak of (018) plane assigned to a crystal structure with space group R-3m to the height ($H_{110}$) of a peak of (110) plane assigned to a crystal structure with space group R-3m and the initial discharge capacity.
Figure 6:
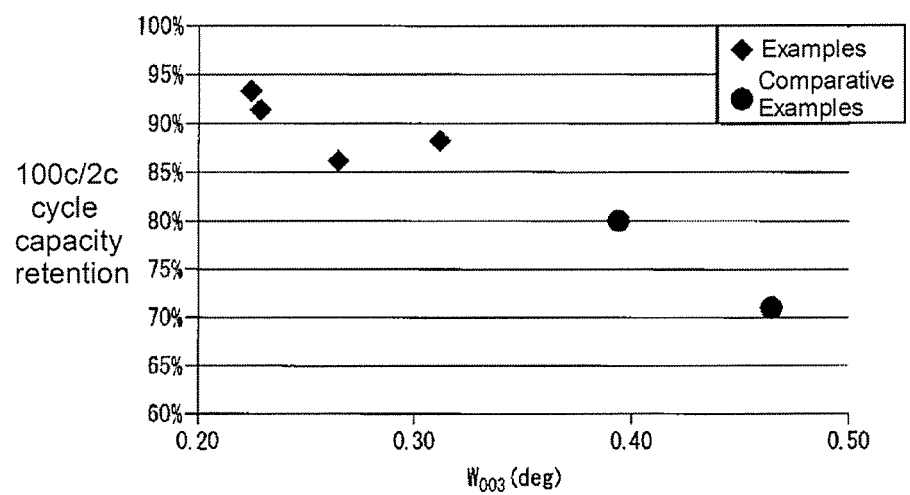
FIG. 6 is a graph illustrating the relation between the integral breadth ($W_{003}$) of a peak of (003) plane assigned to a crystal structure with space group R-3m and the 100c/2c cycle capacity retention.
Figure 7:
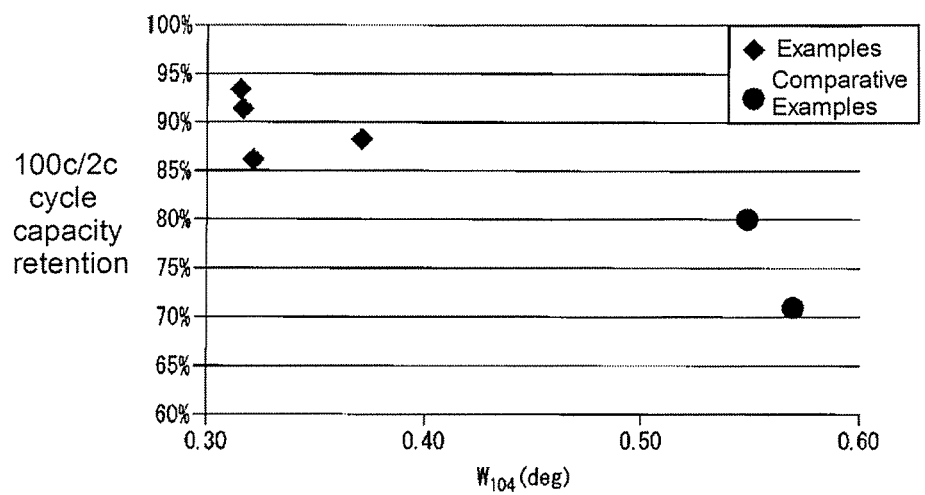
FIG. 7 is a graph illustrating the relation between the integral breadth ($W_{104}$) of a peak of (104) plane assigned to a crystal structure with space group R-3m and the 100c/2c cycle capacity retention.
Figure 8:
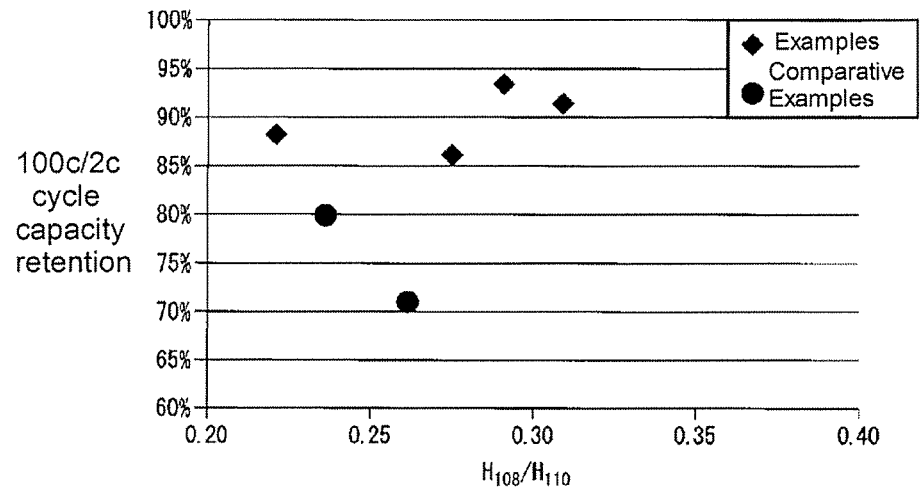
FIG. 8 is a graph illustrating the relation between the ratio ($H_{108}/H_{110}$) of the height ($H_{018}$) of a peak of (018) plane assigned to a crystal structure with space group R-3m to the height ($H_{110}$) of a peak of (110) plane assigned to a crystal structure with space group R-3m and the 100c/2c cycle capacity retention.

In an electric furnace, while supplying air, the temporarily fired product was subjected to main firing at 920° C. in air over a period of 16 hours to obtain a lithium-containing composite oxide. This lithium-containing composite oxide was used as a cathode active material. The results of the measurements and the evaluations are shown in Tables 2 to 4 and FIGS. 1 to 8.

Ex. 2, 3, 5 and 6

Lithium-containing composite oxides in Ex. 2, 3, 5 and 6 were obtained in the same manner as in Ex. 1 except that the conditions were changed as shown in Tables 2 and 3. The lithium-containing composite oxides were used as cathode active materials.

The results of the measurements and the evaluations are shown in Tables 2 to 4 and FIGS. 1 to 8.

Ex. 4

A lithium-containing composite oxide in Ex. 4 was obtained in the same manner as in Ex. 1 except that the conditions were changed as shown in Tables 2 and 3. 10 g of the lithium-containing composite oxide in Ex. 4 was sprayed with 1.07 g of an aqueous basic aluminum lactate solution (manufactured by Taki Chemical Co., Ltd., TAKIC-ERAM KML16, Al content: 8.5 mass % as calculated as $Al_2O_3$), and the lithium-containing composite oxide and the aqueous Al solution were brought into contact with each other while being mixed. The obtained mixture was dried at 90° C. for 3 hours, and heated in an oxygen-containing atmosphere at 450° C. for 5 hours to obtain a cathode active material having an Al compound (1 mol %) attached to the surface of the lithium-containing composite oxide (100 mol %). The results of the measurements and the evaluations are shown in Tables 2 to 4 and FIGS. 1 to 8.

TABLE 2

| | | Production of hydroxide | | | | | | | | | | | |
|---|---|---|---|---|---|---|---|---|---|---|---|---|---|
| | | Supply of | | | | | | | | Hydroxide analysis | | | |
| Ex. | Reactor | Charge [mol %] | | | aqueous sulfate solution [g/min] | Charge of complexing agent $NH_4^x/X$ | Initial pH | Controlled pH | Reaction time [hr] | Reaction temp. [° C.] | Composition analysis | | $D_{50}$ [μm] | Specific surface area [m²/g] |
| | | Ni | Co | Mn | | | | | | | Ni/X | Co/X Mn/X | | |
| 1 | 2 L | 25.0 | 0.0 | 75.0 | 5 | 0.1 | 10.5 | 10.5 | 13 | 50 | 0.250 | 0.000 0.750 | 7.0 | 39.5 |
| 2 | 2 L | 25.0 | 0.0 | 75.0 | 5 | 0.1 | 10.5 | 10.5 | 13 | 50 | 0.250 | 0.000 0.750 | 7.0 | 39.5 |
| 3 | 30 L | 25.0 | 0.0 | 75.0 | 75 | 0.1 | 11 | 11 | 5 | 50 | 0.250 | 0.000 0.750 | 3.1 | 71.0 |
| 4 | 30 L | 25.0 | 0.0 | 75.0 | 75 | 0.1 | 11 | 11 | 5 | 50 | 0.250 | 0.000 0.750 | 3.1 | 71.0 |
| 5 | 2 L | 25.0 | 0.0 | 75.0 | 5 | 0.1 | 11.5 | 11.5 | 5 | 50 | 0.250 | 0.000 0.750 | 3.7 | 87.6 |
| 6 | 2 L | 25.0 | 0.0 | 75.0 | 5 | 0.1 | 11 | 11 | 5 | 50 | 0.250 | 0.000 0.750 | 5.1 | 77.1 |

TABLE 3

| | Production of lithium-containing composite oxide | | | | Lithium-containing composite oxide before activation treatment | | | | | | | | | | | |
|---|---|---|---|---|---|---|---|---|---|---|---|---|---|---|---|---|
| | Charge | Temporary firing | | Main firing | | Composition analysis | | | | $aLi(Li_{1/3}Mn_{2/3})O_2 \cdot (1-a)LiNi_\alpha Co_\beta Mn_\gamma O_2$ | | | | $D_{003}$ [nm] | $D_{110}$ [nm] | $I_{003}/I_{104}$ |
| Ex. | Li/X | [° C.] | [hr] | [° C.] | [hr] | Li/X | Ni/X | Co/X | Mn/X | a | α | β | γ | | | |
| 1 | 1.54 | 600 | 3 | 920 | 16 | 1.540 | 0.250 | 0.000 | 0.750 | 0.637 | 0.544 | 0.000 | 0.456 | 66.8 | 36.3 | 0.994 |
| 2 | 1.58 | 600 | 3 | 965 | 16 | 1.572 | 0.250 | 0.000 | 0.750 | 0.667 | 0.584 | 0.000 | 0.416 | 77.4 | 40.0 | 1.012 |
| 3 | 1.58 | 600 | 3 | 990 | 16 | 1.538 | 0.250 | 0.000 | 0.750 | 0.636 | 0.541 | 0.000 | 0.459 | 90.9 | 72.8 | 1.036 |
| 4 | 1.58 | 600 | 3 | 990 | 16 | 1.544 | 0.250 | 0.000 | 0.750 | 0.642 | 0.548 | 0.000 | 0.452 | 94.7 | 72.6 | 1.047 |
| 5 | 1.58 | 600 | 3 | 990 | 16 | 1.542 | 0.250 | 0.000 | 0.750 | 0.640 | 0.546 | 0.000 | 0.454 | 89.3 | 70.5 | 1.045 |
| 6 | 1.58 | 600 | 3 | 990 | 16 | 1.537 | 0.250 | 0.000 | 0.750 | 0.635 | 0.540 | 0.000 | 0.460 | 95.7 | 72.9 | 1.051 |

TABLE 4

| | Cathode active material | | | Lithium-containing composite oxide after initial charging | | | | Initial discharge capacity [mAh/g] | Cycle test | |
|---|---|---|---|---|---|---|---|---|---|---|
| | | | | | | | | | 50 c/2 c cycle capacity retention [%] | 100 c/2 c cycle capacity retention [%] |
| Ex. | Covering Al compound | $D_{50}$ [μm] | Specific surface area [m²/g] | $W_{003}$ [deg] | $W_{104}$ [deg] | $H_{018}/H_{110}$ | $H_{020}/H_{003}$ | | | |
| 1 | — | 6.7 | 3.07 | 0.464 | 0.569 | 0.262 | 0.048 | 229.8 | 90.6 | 71.0 |
| 2 | — | 6.6 | 2.30 | 0.394 | 0.549 | 0.236 | 0.022 | 221.1 | 98.4 | 79.8 |
| 3 | — | 4.6 | 3.06 | 0.229 | 0.317 | 0.309 | 0.019 | 251.3 | 94.9 | 91.3 |
| 4 | 1 mol % | 4.7 | 3.08 | 0.224 | 0.315 | 0.291 | 0.039 | 251.0 | 95.8 | 93.4 |
| 5 | — | 3.4 | 2.94 | 0.512 | 0.371 | 0.221 | 0.175 | 229.0 | 94.0 | 88.1 |
| 6 | — | 5.3 | 3.30 | 0.265 | 0.322 | 0.275 | 0.043 | 251.0 | 90.7 | 86.0 |

In Ex. 3 to 6, in which in the lithium secondary battery in a charged (oxidized) state, $W_{003}$ of the lithium-containing composite oxide contained in the cathode active material was at most 0.38 deg and $W_{104}$ was at most 0.54 deg, the lithium ion secondary battery was excellent in cycle characteristics, particularly cycle characteristics after 50 cycles.

Whereas in Ex. 1 and 2, in which in the lithium secondary battery in a charged state, $W_{003}$ of the lithium-containing composite oxide contained in the cathode active material was higher than 0.38 deg and $W_{104}$ was higher than 0.54 deg, the lithium ion secondary battery was inferior in cycle characteristics.

INDUSTRIAL APPLICABILITY

By the cathode active material of the present invention, it is possible to obtain a lithium ion secondary battery excellent in the discharge capacity and cycle characteristics.

The entire disclosure of Japanese Patent Application No. 2016-019287 filed on Feb. 3, 2016 including specification, claims, drawings and summary is incorporated herein by reference in its entirety.

The invention claimed is:

1. A cathode active material contained in a positive electrode of a lithium ion secondary battery, which comprises a lithium-containing composite oxide represented by the following formula (1):

$$aLi(Li_{1/3}Mn_{2/3})O_2.(1-a)LiMO_2 \quad \text{formula (1)}$$

wherein M is at least one transition metal element selected from Ni, Co and Mn, and "a" is higher than 0 and less than 1;
 wherein the lithium-containing composite oxide contained in the lithium ion secondary battery charged to a potential of 4.5 V vs. Li/Li$^+$ is such that, in an X-ray diffraction pattern, the integral breadth of a peak of (003) plane assigned to a crystal structure with space group R-3m is at most 0.38 deg, and the integral breadth of a peak of (104) plane assigned to a crystal structure with space group R-3m is at most 0.54 deg, and
 wherein the specific surface area of the cathode active material is from 0.5 to 5 m$^2$/g.

2. The cathode active material according to claim 1, the lithium-containing composite oxide contained in the lithium ion secondary battery charged to a potential of 4.5 V vs. Li/Li$^+$ is such that, in an X-ray diffraction pattern, the ratio ($H_{018}/H_{110}$) of the height ($H_{018}$) of a peak of (018) plane assigned to a crystal structure with space group R-3m to the height ($H_{110}$) of a peak of (110) plane assigned to a crystal structure with space group R-3m is at least 0.27.

3. The cathode active material according to claim 1, wherein of the lithium-containing composite oxide, in an X-ray diffraction pattern, the ratio ($I_{003}/I_{104}$) of the integrated intensity ($I_{003}$) of a peak of (003) plane assigned to a crystal structure with space group R-3m to the integrated intensity ($I_{104}$) of a peak of (104) plane assigned to a crystal structure with space group R-3m is from 1.015 to 1.5.

4. The cathode active material according to claim 1, wherein the lithium-containing composite oxide contained in the lithium ion secondary battery charged to a potential of 4.5 V vs. Li/Li$^+$ is such that in an X-ray diffraction pattern of the lithium-containing composite oxide, the ratio ($H_{020}/H_{003}$) of the height ($H_{020}$) of a peak of (020) plane assigned to a crystal structure with space group C2/m to the height ($H_{003}$) of a peak of (003) plane assigned to a crystal structure with space group R-3m is at least 0.01.

5. The cathode active material according to claim 1, wherein of the lithium-containing composite oxide, to the total molar amount (X) of Ni, Co and Mn, the ratio (Ni/X) of the molar amount of Ni is from 0.15 to 0.5, the ratio (Co/X) of the molar amount of Co is from 0 to 0.2, and the ratio (Mn/X) of the molar amount of Mn is from 0.45 to 0.8.

6. The cathode active material according to claim 1, wherein $D_{50}$ of the cathode active material is from 3 to 15 µm.

7. The cathode active material according to claim 1, wherein in an X-ray diffraction pattern of the lithium-containing composite oxide, the crystallite size obtained by the Scherrer equation from a peak of (003) plane assigned to a crystal structure with space group R-3m is from 60 to 140 nm.

8. The cathode active material according to claim 1, wherein in an X-ray diffraction pattern of the lithium-containing composite oxide, the crystallite size obtained by the Scherrer equation from a peak of (110) plane assigned to a crystal structure with space group R-3m is from 30 to 90 nm.

9. A positive electrode for a lithium ion secondary battery, which comprises a cathode active material layer containing the cathode active material as defined in claim 1, an electrically conductive material and a binder, on a positive electrode current collector.

10. A lithium ion secondary battery, which comprises the positive electrode for a lithium ion secondary battery as defined in claim 9, a negative electrode, a separator and a non-aqueous electrolyte.

11. A cathode active material contained in a positive electrode of a lithium ion secondary battery, which comprises a lithium-containing composite oxide represented by the following formula (2):

$$aLi(Li_{1/3}Mn_{2/3})O_2.(1-a)LiNi_\alpha Co_\beta Mn_\gamma O_2 \quad \text{formula (2)}$$

wherein "a" is higher than 0 and less than 1, "α" is higher than 0 and less than 1, "β" ranges from 0 to less than 1, and "γ" is higher than 0 and less than 1;
 wherein the lithium-containing composite oxide is electrochemically oxidized to a potential of 4.5 V vs. Li/Li$^+$; in an X-ray diffraction pattern, the integral breadth of a peak of (003) plane assigned to a crystal structure with space group R-3m is at most 0.38 deg, and the integral breadth of a peak of (104) plane assigned to a crystal structure with space group R-3m is at most 0.54 deg.

* * * * *